(12) United States Patent
Ogawa et al.

(10) Patent No.: US 7,323,261 B2
(45) Date of Patent: Jan. 29, 2008

(54) COMPRESSIBLE PRINTING BLANKET AND METHOD OF MANUFACTURING A COMPRESSIBLE PRINTING BLANKET

(75) Inventors: Yoshiharu Ogawa, Ibaraki (JP); Hisashi Furuta, Ibaraki (JP); Akiyoshi Inoue, Ibaraki (JP)

(73) Assignee: Kinyosha Co., Ltd., Tokyo (JP)

( * ) Notice: Subject to any disclaimer, the term of this patent is extended or adjusted under 35 U.S.C. 154(b) by 0 days.

(21) Appl. No.: 11/499,061

(22) Filed: Aug. 4, 2006

(65) Prior Publication Data

US 2006/0269800 A1 Nov. 30, 2006

Related U.S. Application Data

(63) Continuation of application No. 10/422,565, filed on Apr. 24, 2003, now abandoned, which is a continuation-in-part of application No. PCT/JP01/08456, filed on Sep. 27, 2001.

(30) Foreign Application Priority Data

Sep. 6, 2002 (AR) ............... P020103366

(51) Int. Cl.
  *B32B 27/00* (2006.01)
  *B32B 15/14* (2006.01)
  *B32B 29/00* (2006.01)
(52) U.S. Cl. ............... 428/909; 428/411.1; 428/423.9; 442/234; 442/260
(58) Field of Classification Search ............... 428/909, 428/411.1, 423.9; 442/234, 260
See application file for complete search history.

(56) References Cited

U.S. PATENT DOCUMENTS 3,515,625 A 6/1970 Sedlak et al.
4,770,928 A 9/1988 Gaworowski et al.
5,364,683 A 11/1994 Flint et al.

(Continued)

FOREIGN PATENT DOCUMENTS

EP 0987125 A1 3/2000

(Continued)

OTHER PUBLICATIONS

English-language translation of an International Search Report dated Jan. 15, 2002 in connection with International Application No. PCT/JP01/08456.

(Continued)

*Primary Examiner*—Lynda Salvatore
(74) *Attorney, Agent, or Firm*—John P. White; Cooper & Dunham LLP

(57) ABSTRACT

Disclosed is a compressible printing blanket in which voids are formed in the compressible layer by using microballoons, comprising at least two fabric layers, an adhesive layer interposed between adjacent fabric layers, a surface rubber layer, and a compressible layer arranged between the at least two fabric layers and the surface rubber layer and containing spherical voids and voids having a shape other than a sphere in a ratio defined in formula given below:

$$S_1:S_2 = 20:80 \text{ to } 95:5 \quad (1)$$

where, $S_1$ denotes the number of spherical voids per unit area in a cross section of the compressible layer, and $S_2$ denotes the number of voids having a shape other than a sphere per unit area in a cross section of the compressible layer.

14 Claims, 4 Drawing Sheets

U.S. PATENT DOCUMENTS

| | | |
|---|---|---|
| 5,934,192 A | 8/1999 | Ogita et al. |
| 6,333,372 B1 | 12/2001 | Tomihashi et al. |
| 2003/0129384 A1 | 7/2003 | Kalchbrenner |

FOREIGN PATENT DOCUMENTS

| | | |
|---|---|---|
| JP | 2-3860 | 1/1990 |
| JP | 3-290291 | 12/1991 |
| JP | 5-309970 | 11/1993 |
| JP | 405309970 A * | 11/1993 |
| JP | 6-1091 | 1/1994 |
| JP | 2670188 | 7/1997 |
| JP | 10-175381 | 6/1998 |
| JP | 2001-30650 | 2/2001 |
| JP | 2001-220510 | 8/2001 |

OTHER PUBLICATIONS

Japanese-language International Preliminary Examination Report and English-language translation thereof, dated Jun. 9, 2003 in connection with International Application No. PCT/JP01/08456.

* cited by examiner

COMPRESSIBLE PRINTING BLANKET AND METHOD OF MANUFACTURING A COMPRESSIBLE PRINTING BLANKET

CROSS-REFERENCE TO RELATED APPLICATIONS

This application is a Rule 1.53(b) continuation of U.S. Ser. No. 10/422,565, filed Apr. 24, 2003, now abandoned which is a Continuation-in-Part Application of PCT Application No. PCT/JP01/08456, filed Sep. 27, 2001, which was not published under PCT Article 21(2) in English, the entire contents of each of which are incorporated herein by reference.

BACKGROUND OF THE INVENTION

1. Field of the Invention

The present invention relates to a compressible printing blanket and a method of manufacturing a compressible printing blanket.

2. Description of the Related Art

A method of manufacturing a laminated printing blanket is disclosed in, for example, U.S. Pat. No. 4,770,928. It is disclosed in this prior art that an intermediate compressible layer is prepared by dispersing microcapsules consisting of a copolymer between, for example, acrylonitrile and vinylidene chloride in an elastomeric material, and that the intermediate compressible layer thus prepared is vulcanized for 1 to 12 hours at a temperature lower than the melting point of the microcapsule, e.g., at about 110° F. (43° C.) to 170° F. (77° C.), so as to fix the microcapsules in place within the structure of the elastomeric material. In this prior art, vulcanization is performed at a low temperature and, thus, used is an accelerator such as dithiocarbamate. It is also taught that after a cloth and a surface rubber layer is further mounted to the vulcanized compressible intermediate layer, vulcanization is applied again at 132° C. to 160° C. so as to obtain a final product. What should be noted is that the vulcanization is carried out twice in this prior art.

Further, U.S. Pat. No. 4,770,928 quoted above teaches in column 3, lines 60 to 66, "As illustrated in the drawing, the voids 28 in the compressible layer 24 have substantially uniform size and substantially uniform distribution and are not interconnected. It has been found that the dimensions of the voids 28 produced in the compressible layer 24 are generally in the same range as the dimensions of the microcapsules used to create voids." This prior art also teaches in column 5, lines 4 to 5, "The microcapsules used in the method claimed are approximately spherical in shape." What should be noted is that the voids present in the compressible layer in this prior art are substantially uniform in size and are substantially spherical in shape.

Japanese Patent No. 2670188 is directed to a compressible layer for a printing blanket. This Japanese Patent teaches in column 8, lines 20 to 23, that the intermediate layer has a cellular structure consisting of closed voids, has a uniform thickness, has uniform size voids distributed uniformly, and has the voids not connected to each other." This prior art also teaches in column 8, lines 41 to 45, "As shown in FIG. 1, these voids 30 are uniform in size and distribution and are not connected to each other. The size of the void 30 formed within the compressible layer 10 has been found to be substantially within the same range as the microsphere used for forming the void." In conclusion, the voids formed in the compressible layer in this prior art have microsphere shape having a uniform size.

On the other hand, FIG. 2 of Jpn. Pat. KOKAI Publication No. 6-1091 shows that spherical microballoons having a substantially uniform size are present in the compressible layer of a compressible rubber blanket for Example 1.

However, the printing blanket equipped with a compressible layer, which is disclosed in the three prior arts pointed out above, gives rise to the problem that a flat region A in which the compressive stress ($kgf/cm^2$) is not in proportion to the smash thickness (mm) is present over a wide range in the compressive stress curve, as apparent from the graph showing the change in the compressive stress relative to the smash thickness (pushing amount) shown in FIG. 7 included in the accompanying drawings. As a result, a difficulty tends to be brought that the compressive stress is not increased in spite of the increase in the smash thickness, so as to cause the printed surface to become blurred. Also, if the compressibility of the compressible layer is enhanced, the flat region A in the compressive stress curve is further expanded so as to further promote the defect noted above.

Incidentally, FIG. 2 of U.S. Pat. No. 5,364,683 teaches that the density is substantially linearly increased in increasing the smash thickness in the 5056 type printing blanket equipped with a compressible layer manufactured by a salt leaching method.

In the salt leaching method, a mixture of a rubber compound and a soluble salt is vulcanized first, followed by extracting the salt with warm water so as to form a compressible layer. In this method, it is necessary to dispose of the waste water after extraction of the salt so as to make the method troublesome. In addition, the particular method is not desirable in view of the environmental damage. Further, an open void structure is formed in the compressible layer formed by the salt leaching method, giving rise to the problem that the washing solution tends to remain in the compressible layer when the blanket is washed. The washing solution remaining within the compressible layer swells or hardens the compressible layer so as to lower the compressibility of the compressible layer.

Further, Jpn. Pat. Appln. KOKAI Publication No. 10-175381 discloses a printing blanket equipped with a porous compressible layer having closed cells and open cells in a lower section than the surface printing layer. The manufacturing method of the printing blanket is described in paragraphs [0021] to [0022] of this document.

To quote: "an unvulcanized matrix rubber is dissolved into an appropriate solvent, and either a foaming agent or a hollow fine particles that serves to create closed cells CC, and particles used for a leaching method that serve to create open cells OC are blended into the solvent, thus preparing a rubber paste. Thus obtained rubber paste is then applied on a base fabric (, that is, in the example shown in the figure, the upper most fabric of the support layer 11, or the fabric serving as the reinforcement layer 13), and dried and heated, followed by vulcanization.

Here, in the case where the foaming agent is used, the agent is decomposed due to the heat generated in the vulcanization, thus generating gas. In this manner, closed cells CC are created in the matrix rubber. In the case of the hollow fine particles, it is only natural that closed cells CC are created as soon as they are blended thereinto. After that, when the particles used for the leaching method, that are dispersed in thus formed layer are extracted with an appropriate solvent, the imprints of the extracted particles give rise to open cells OC. Thus, the porous compressible layer 12 in which closed cells CC and open cells OC are mixedly present, is formed."

As described above, open cells OC is made of a number of voids that are coupled with each other. With this structure, when the printing blanket disclosed in the KOKAI Publication is washed, a great amount of washing solution remains in the compressible layer 12, thus causing hardening of the compressible layer 12.

BRIEF SUMMARY OF THE INVENTION

An object of the present invention is to provide a compressible printing blanket in which voids are formed in a compressible layer by using microballoons, the compressible printing blanket being substantially free from the flat region in the compressive stress curve in which the compressive stress is maintained substantially constant regardless of the increase in the smash thickness, and a method of manufacturing the particular compressible printing blanket.

According to a first aspect of the present invention, there is provided a compressible printing blanket in which voids are formed in the compressible layer by using microballoons, comprising:

at least two fabric layers;

an adhesive layer interposed between adjacent fabric layers;

a surface rubber layer; and a compressible layer arranged between the at least two fabric layers and the surface rubber layer and containing spherical voids and voids having a shape other than a sphere in a ratio defined in formula (1) given below:

$$S_1:S_2=20:80 \text{ to } 95:5 \qquad (1)$$

where, $S_1$ denotes the number of spherical voids per unit area in a cross section of the compressible layer, and $S_2$ denotes the number of voids having a shape other than a sphere per unit area in a cross section of the compressible layer.

According to a second aspect of the present invention, there is provided a method of manufacturing a compressible printing blanket, comprising vulcanizing a blanket precursor at temperatures not lower than 120° C., the blanket precursor including at least two fabric layers, an unvulcanized adhesive layer interposed between adjacent fabric layers, an unvulcanized surface rubber layer, and an unvulcanized compressible layer interposed between the at least two fabric layers and the unvulcanized surface rubber layer, and the unvulcanized compressible layer containing microballoons and a melting agent of the microballoons.

Further, according to a third aspect of the present invention, there is provided a method of manufacturing a compressible printing blanket, comprising:

applying a vulcanizing treatment at temperatures not lower than 120° C. to a laminate structure including a fabric layer, a reinforcing layer, and an unvulcanized compressible layer interposed between the fabric layer and the reinforcing layer and containing microballoons and a melting agent of the microballoons;

laminating at least one new fabric layer on the fabric layer of the laminate structure with an unvulcanized adhesive layer interposed between these fabric layers and laminating an unvulcanized surface rubber layer on the reinforcing layer of the laminate is structure with an unvulcanized adhesive rubber layer interposed therebetween so as to obtain a rubber blanket precursor; and vulcanizing the rubber blanket precursor under temperatures not lower than 120° C.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawing, which are incorporated in and constitute a part of the specification, illustrate presently preferred embodiments of the present invention, and together with the general description given above and the detailed description of the preferred embodiments given below, serve to explain the principles of the present invention.

DETAILED DESCRIPTION OF THE INVENTION

Figure 1:
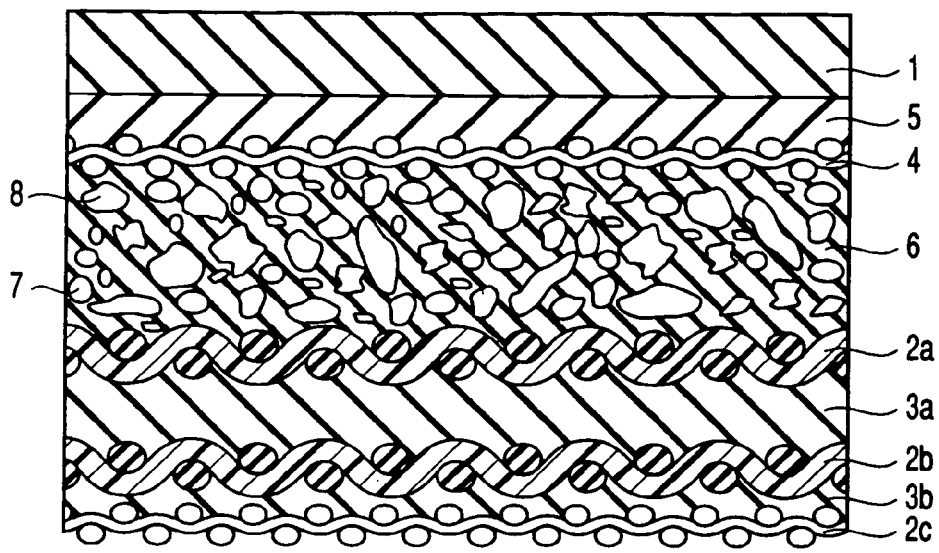
FIG. 1 schematically shows as an example the compressible printing blanket for Example 1 of the present invention.

The compressible printing blanket according to the present invention will now be described in detail.

According to a first aspect of the present invention, there is provided a compressible printing blanket in which voids are formed in the compressible layer by using microballoons, comprising:

at least two fabric layers;

an adhesive layer interposed between adjacent fabric layers;

a surface rubber layer; and a compressible layer interposed between said at least two fabric layers and said surface rubber layer and containing spherical voids and voids having a foreign shape in a ratio defined in formula (1) given below:

$$S_1:S_2=20:80 \text{ to } 95:5 \qquad (1)$$

where, $S_1$ denotes the number of spherical voids per unit area in a cross section of the compressible layer, and $S_2$ denotes the number of foreign-shaped voids per unit area in a cross section of the compressible layer.

The cross section of the compressible layer denotes an optional cross section of the cross sections obtained when the compressible layer is cut in a thickness direction.

In the compressible printing blanket of the present invention, it is possible for a reinforcing layer to be arranged between the surface rubber layer and the compressible layer.

The fabric layer, the adhesive layer, the surface rubber layer, the compressible layer and the reinforcing layer included in the compressible printing blanket of the present invention will now be described.

1) Compressible Layer

The term "void having a foreign shape" used herein denotes a void other than a spherical void. The foreign-shaped void includes, for example, a void having an elliptical cross section, a void having a vertically oblong cross section, a void having a flattened cross section, and an amorphous void.

In the compressible printing blanket of the present invention, the compressible layer contains spherical voids and foreign-shaped voids meeting the ratio defined in formula (1) given above. If the ratio $S_2$ of the foreign-shaped voids is smaller than 5, the ratio of the relatively thick void wall to the rubber matrix wall partitioning the adjacent voids is rendered deficient, with the result that it is difficult to overcome the phenomenon that the compressive stress is not increased linearly when the smash thickness is increased. On the other hand, if the ratio $S_2$ of the foreign-shaped voids exceeds 80, the compressible layer fails to play its inherent role, resulting in a poor restoring capability against compression. It is more desirable for the ratio of $S_1$ to $S_2$ to fall within a range of between 20:80 and 80:20.

It is desirable for the compressible layer to be formed mainly of an oil-resistant rubber matrix. The oil-resistant rubber matrix can be obtained by vulcanization. Where printing is performed by using an ink using a non-polar solvent, it is possible to use polar polymers such as acrylonitrile-butadiene rubber (NBR), chloroprene rubber (CR), fluorine-contained rubber (FKM) and polyurethane rubber as the rubber material. On the other hand, the printing is performed by using an ink using a polar solvent, it is possible to use non-polar polymers such as ethylene-propylene rubber (EPDM), and butyl rubber (IIR) as the rubber material. It is possible for the rubber mixture to contain an additive, as required, in addition to the rubber material. The additives used in the present invention include, for example, a vulcanizing agent, a vulcanization accelerator such as D.M (dibenzothiazole, disulfide) and M (2-mercaptobenzothiazole), an aging preventive, a reinforcing agent, a filler and a plasticizer.

It is possible for the compressible layer to contain glycols. The glycols used in the present invention include, for example, such as ethylene glycol, diethylene glycol, and triethylene glycol. It is possible for a single or a plurality of different kinds of glycols to be contained in the compressible layer.

It is desirable for the glycol content of the compressible layer to fall within a range of between 0.1 and 15 parts by weight relative to 100 parts by weight of the raw material rubber. It is more desirable for the glycol content noted above to fall within a range of between 1 and 15 parts by weight relative to 100 parts by weight of the raw material rubber.

It is desirable for the thickness of the compressible layer to fall-within a range of between 0.2 and 0.6 mm. If the thickness of the compressible layer is smaller than 0.2 mm, it is difficult to impart a sufficient compressibility to the blanket. On the other hand, if the thickness of the compressible layer exceeds 0.6 mm, the ratio of the compressible layer in the blanket is rendered large, with the result that the balance of the members forming the blanket tends to be impaired. If the balance of the constituting members is collapsed, promoted is the problem that the compressive stress is not increased linearly when the smash thickness (pushing amount) is increased. It is more desirable for the thickness of the compressible layer to fall within a range of between 0.2 and 0.4 mm.

2) Adhesive Layer

The adhesive layer contains an oil-resistant rubber matrix as a main component. It is possible to use the rubber material and the additives similar to those described previously in conjunction with the compressible layer.

It is desirable for voids to be formed in the adhesive layer and for the shape of the void to be spherical. It is possible to enhance the compressibility of the blanket while suppressing the phenomenon that the compressive stress is not in proportion to the smash thickness by forming spherical voids in the adhesive layer.

It is desirable for the spherical voids to be provided by microballoons.

The microballoons should desirably be formed of a thermoplastic resin. The thermoplastic resins used for forming the microballoons include, for example, a copolymer between methacrylonitrile and acrylonitrile, homopolymers and copolymers of vinylidene halide, fluorine-containing plastic materials, polyaryl ether ketones, nitrile resins, polyamide imides, polyarylates, polybenzoimidazoles, polycarbonates, thermoplastic polyesters, polyether imides, polyamides, polymethyl pentene, modified polyphenylene oxide, polyphenylene sulfide, polypropylene, and chlorinated polyvinyl chloride. The microballoons can be formed by using a single or a plurality of the thermoplastic resins enumerated above. Particularly, it is desirable for the microballoons to contain a copolymer between methacrylonitrile and acrylonitrile.

It is desirable for the microballoons to contain a copolymer between methacrylonitrile and acrylonitrile. The copolymer has a thermal deformation temperature not lower than 120° C. and has a resistance to pressure of 40 kg/cm$^2$.

It is desirable for the microballoons to have an average particle diameter falling within a range of between 1 and 200 μm. If the average particle diameter is smaller than 1 μm, the thickness of the wall defining the cell (void) is increased, resulting in failure to obtain a high compressibility. On the other hand, if the average particle diameter of the microballoons exceeds 200 μm, the thickness of the wall defining the void is rendered excessively small, with the result that the compressibility is rendered excessively large. In other words, the blanket tends to be rendered excessively soft. It is more desirable for the average particle diameter of the microballoons to fall within a range of between 30 μm and 100 μm. It is possible to use microballoons applied to an expanding treatment and having an average particle diameter falling within a range of between 1 μm and 200 μm as the microballoons contained in the unvulcanized compressible layer. Also, it is possible to use microballoons not applied to an expanding treatment and having an average particle diameter falling within a range of between 1 μm and 200 μm as the microballoons contained in the unvulcanized compressible layer. Incidentally, the average particle diameter of the microballoons is measured by the method described below.

Specifically, a small amount of the microballoons are collected, disposed on a slide of a microscope and spreaded over the slide such that the microballoon particles are positioned apart from each other. The reflex of the microscope is transferred into a computer through a video camera so as to process and analyze the reflex and, thus, to measure the radius of the particles. At least 1,000 microballoons are analyzed so as to obtain an average particle diameter.

It is desirable for the microballoon content of the adhesive layer to fall within a range of between 1 and 4 parts by weight relative to 100 parts by weight of the raw material rubber. If the content of the microballoons is smaller than 1 part by weight, it is difficult to obtain a sufficient effect of improving the compressibility of the blanket. Therefore, it is possible for the compressibility of the blanket to be substantially equal to that of the solid (microballoon content of 0 part by weight). On the other hand, if the microballoon content of the adhesive layer exceeds 4 parts by weight, it is possible for the adhesive layer to play the role of a compressible layer rather than the role of the adhesive layer for bonding the fabric layer. Since the adhesive layer fails to play its original role, deviation among the fabric layers tends to take place so as to bring about the problem such as the printing deviation.

It is possible for spherical voids alone to be formed in the adhesive layer. It is also possible for both the spherical voids and voids having a foreign shape to be formed in the adhesive layer. As pointed out previously, foreign-shaped voids denote the voids other than the spherical voids. The foreign-shaped voids are shaped as described previously in conjunction with the compressible layer. It is desirable for the ratio between the spherical voids and the voids having a foreign shape to meet formula (3) given below:

$$P_1:P_2=20:80 \text{ to } 95:5 \quad (3)$$

where $P_1$ denotes the number of spherical voids per unit area in a cross section of the adhesive layer, and $P_2$ denotes the number of foreign-shaped voids per unit area in a cross section of the adhesive layer. The cross section of the adhesive layer denotes an optional cross section among the cross sections obtained when the adhesive layer is cut in a thickness direction.

Where the ratio between the spherical voids and the foreign-shaped voids satisfies formula (3) given above, it is possible to suppress more effectively the phenomenon that the compressive stress is rendered substantially constant regardless of the increase in the smash thickness. It is also possible to improve the compressibility of the blanket. It is more desirable for the ratio of $P_1$ to $P_2$ to fall within a range of between 20:80 and 80:20.

It is desirable for the thickness of the adhesive layer to fall within a range of between 0.03 mm and 0.1 mm. If the thickness of the adhesive layer is smaller than 0.03 mm, the thickness of the adhesive layer tends to become nonuniform, resulting in failure to obtain a uniform adhesive force. On the other hand, if the thickness of the adhesive layer exceeds 0.1 mm, it is possible for the adhesive layer to fail to play its original role. As a result, deviation takes place among the fabric layers so as to bring about the problem such as printing deviation.

3) Surface Rubber Layer

It is possible for the surface rubber layer to be formed of a vulcanized sheet of a rubber blend. It is possible to use, for example, an acrylonitrile-butadiene rubber as the rubber material contained in the rubber blend.

4) Fabric Layer

The compressible printing blanket of the present invention includes at least two fabric layers. It is desirable for these fabric layers to be made integral by the adhesive layer interposed between the adjacent fabric layers.

It is possible to use, for example, a cotton cloth as the fabric layer.

5) Reinforcing Layer

It is possible for the reinforcing layer to be formed of, for example, a cotton cloth.

It is possible for the compressible printing blanket of the present invention to be formed by the manufacturing method (A) or the manufacturing method (B) given below.

Manufacturing Method (A):

<Preparation of Unvulcanized Compressible Layer>

Prepared first is a rubber blend containing a rubber material, microballoons, a melting agent of the microballoons, and a solvent. Then, an unvulcanized compressible layer is formed by coating a fabric layer with the rubber blend.

It is desirable to use a microballoon melting agent whose compatibility with the microballoons is not excessively high under room temperature and is increased in the temperature elevation stage such as the rubber vulcanizing step. Such a melting agent includes, for example, glycols. Glycols are particularly effective for microballoons containing a copolymer between methacrylonitrile and acrylonitrile. Among the glycols, it is desirable to use ethylene glycol, diethylene glycol and triethylene glycol. It is possible to use a single or a plurality of glycols as the melting agent.

It is desirable for the content of the melting agent of the microballoons in the unvulcanized compressible layer to fall within a range of between 0.1 and 15 parts by weight relative to 100 parts by weight of the rubber material. If the microballoon melting agent is added to the unvulcanized compressible layer, the compatibility between the microballoons and the melting agent is increased in the rubber vulcanizing step. As a result, the cells of the microballoons are collapsed by the melting so as to bring about coupling of the cells and, thus, to obtain voids having a foreign shape. It is possible to control the mixing ratio of the foreign-shaped voids by, for example, controlling the addition amount of the melting agent. To be more specific, if the content of the melting agent is smaller than 0.1 part by weight, the mixing ratio $S_2$ of the foreign-shaped voids is rendered smaller than 5. On the other hand, if the content of the melting agent is higher than 15 parts by weight, the mixing ratio $S_2$ of the foreign-shaped voids is caused to exceed 80. It is more desirable for the addition amount of the microballoon melting agent to fall within a range of between 1 and 15 parts by weight. Incidentally, if the addition amount of the melting agent is excessively large, the compressibility of the compressible layer tends to be increased. It is desirable for the addition amount of the melting agent to fall within a range of between 1 and 3 parts by weight in order to control smoothly the printing surface relative to the smash thickness without increasing the compressibility.

It is desirable for the microballoon content of the unvulcanized compressible layer to fall within a range of between 5 and 15 parts by weight relative to 100 parts by weight of the rubber material. If the microballoon content is lower than 5 parts by weight, the amount of voids within the compressible layer tends to become insufficient so as to result in failure to obtain a sufficient compressible layer. On the other hand, if the microballoon content is higher than 15 parts by weight, the thickness of the rubber matrix wall partitioning the adjacent voids is rendered thin, resulting in buckling of the void wall by the compression force during use. It follows that it is possible to promote the problem that the compressive stress is not increased linearly in accordance with increase in the smash thickness (pushing amount).

It is desirable for the average particle diameter of the microballoons contained in the unvulcanized compressible layer to fall within a range of between 1 and 200 µm. If the average particle diameter is smaller than 1 µm, the thickness of the wall defining the cell (void) is increased, resulting in failure to obtain a sufficient compressibility. On the other hand, if the average particle diameter exceeds 200 µm, the wall thickness is decreased so as to render the compressibility excessively large. In other words, it is possible for the blanket to be rendered excessively soft. It is possible to use microballoons applied to an expanding treatment and having an average particle diameter falling within a range of between 1 µm and 200 µm as the microballoons added to the unvulcanized compressible layer. Also, it is possible to use microballoons not applied to an expanding treatment and having an average particle diameter falling within a range of between 1 µm and 200 µm as the microballoons added to the unvulcanized compressible layer. It is more desirable for the average particle diameter of the microballoons to fall within a range of between 30 µm and 100 µm. Incidentally, the average particle diameter of the microballoons is measured by the method described previously.

<Preparation of Unvulcanized Adhesive Layer>

In the first step, prepared is a rubber blend containing a rubber material and a solvent as the unvulcanized adhesive layer. It is possible to add microballoons to the unvulcanized adhesive layer. Incidentally, in order to obtain the adhesive layer having the ratio between the spherical voids and the foreign-shaped voids satisfying formula (3) given previously, added are microballoons and a melting agent of the microballoons.

<Preparation of Blanket Precursor>

Prepared is a blanket precursor including at least two fabric layers, an unvulcanized adhesive layer arranged between adjacent fabric layers, an unvulcanized surface rubber layer, and an unvulcanized compressible layer arranged between at least two fabric layers and the unvulcanized surface rubber layer.

<Vulcanizing Step>

The blanket precursor thus prepared is vulcanized under temperatures not lower than 120° C., preferably under temperatures falling within a range of between 120° C. and 160° C., followed by cooling the vulcanized blanket precursor and subsequently polishing the surface rubber layer so as to obtain a compressible printing blanket of the present invention.

In the manufacturing method (A), the vulcanization is performed in a single step so as to make it possible to simplify the manufacturing process. In addition, it is possible to suppress the deterioration of the fabric layers and the reinforcing layer caused by the heating.

Manufacturing Method (B):

<First Vulcanizing Step>

In the first step, prepared is a rubber blend containing a rubber material, microballoons, a melting agent of the microballoons, and a solvent, followed by coating the fabric layer with the resultant rubber blend so as to form an unvulcanized compressible layer. Then, a reinforcing layer is laminated on the unvulcanized compressible layer so as to obtain a laminate structure. It is possible to use the microballoons and the melting agent of the microballoons similar to those described previously in conjunction with the manufacturing method (A).

In the next step, the laminate structure is subjected to a heat treatment at temperatures not lower than 120° C., preferably at temperatures falling within a range of between 120° C. and 160° C., so as to vulcanize the unvulcanized compressible layer. It is desirable for the vulcanizing treatment to be performed for 1 to 6 hours.

<Second Vulcanizing Step>

After formation of an unvulcanized adhesive layer on the fabric layer included in the laminate structure, a second fabric layer is laminated. The number of fabric layers is not limited to two. It is possible for three or more fabric layers to be laminated one upon the other. On the other hand, after formation of an unvulcanized adhesive layer on the reinforcing layer of the laminate structure, an unvulcanized surface rubber layer is laminated so as to obtain a rubber blanket precursor. It is possible for the unvulcanized adhesive layer to be formed of a rubber blend containing a rubber material and a solvent. It is also possible to add microballoons to the unvulcanized adhesive layer. Incidentally, in order to obtain the adhesive layer containing spherical voids and foreign-shaped voids mixed to satisfy formula (3) described previously, added are microballoons and a melting agent of the microballoons.

In the next step, the rubber blanket precursor thus prepared is subjected to a heat treatment under temperatures not lower than 120° C., preferably under temperatures falling within a range of between 120° C. and 160° C., so as to vulcanize the layers other than the unvulcanized compressible layer, e.g., to vulcanize the unvulcanized surface rubber layer and the unvulcanized adhesive layer, followed by cooling the rubber blanket precursor and subsequently polishing the surface rubber layer so as to obtain a compressible printing blanket of the present invention.

In the manufacturing method (B), the vulcanization is carried out twice. To reiterate, the unvulcanized compressible layer is vulcanized and formed, followed by vulcanizing the other layers including the unvulcanized surface rubber layer and the unvulcanized adhesive layer. The particular method makes it possible to suppress the influences such as the heat conductivity and the pressure, present in the vulcanizing step of the unvulcanized compressible layer, to the other layers. It follows that it is possible to form the compressible layer with a higher stability.

An example of the compressible printing blanket according to one embodiment of the present invention will now be described with reference to FIG. 1. Specifically, FIG. 1 schematically shows as an example the construction of the compressible printing blanket according to one embodiment of the present invention.

As shown in the drawing, the compressible printing blanket of the present invention comprises a surface rubber layer 1 and three fabric layers 2a to 2c. Each of the fabric layers 2a to 2c is formed of, for example, a cotton cloth. Also, these three fabric layers 3a to 3c are made integral by an adhesive layer 3a interposed between the fabric layers 2a and 2b and another adhesive layer 3b interposed between the fabric layers 2b and 2c. The compressible printing blanket also comprises a reinforcing layer 4 and an adhesive layer 5. The reinforcing layer 4, which is formed of, for example, a cotton cloth, is laminated on the back surface of the surface rubber layer 1 with the adhesive layer 5 interposed therebetween. The compressible printing blanket of the present invention also includes a compressible layer 6, which is interposed between the uppermost layer 2a of the three fabric layers 2a to 2c, i.e., the fabric layer 2a on the side of the surface rubber layer 1, and the reinforcing layer 4. The compressible layer 6 contains spherical voids 7 and voids 8 having a foreign shape. FIG. 1 shows that the foreign-shaped voids 8 include amorphous voids, elliptical voids, etc. It is desirable for the ratio between the spherical voids 7, i.e., $S_1$, and the foreign-shaped voids 8, i.e., $S_2$, to fall within a range of between 20:80 and 95:5. It should be noted that these spherical voids 7 and the foreign-shaped voids 8 are formed by using microballoons.

The compressible printing blanket of the present invention described above is a compressible printing blanket having voids formed in the compressible layer by using microballoons and comprising the compressible layer having the spherical voids $S_1$ and the foreign-shaped voids $S_2$ contained to meet the ratio given in formula (1) below:

$$S_1:S_2=20:80 \text{ to } 95:5 \quad (1)$$

According to the blanket of the particular construction, it is possible to suppress the phenomenon that the compressive stress is left substantially constant in spite of the increase in the smash thickness so as to overcome the problem that the printing surface is blurred in spite of the increase of the smash thickness. It follows that it is possible to control the concentration of the printing caused by the smash thickness without fail. The particular effect is considered to be derived by the mechanism described below.

Specifically, the problem that the compressive stress is not increased linearly in proportion to the smash thickness (pushing amount), i.e., the problem that the compressive stress is not increased in spite of the increase in the smash thickness so as to blur the printing, is rendered prominent if the compressibility of the compressible layer is increased. It follows that the particular problem is considered to be caused by the buckling of the rubber matrix wall partitioning the adjacent cells (voids) in the compressible layer. In the case of using a compressible layer in which spherical cells are dispersed uniformly, the thickness of the rubber matrix wall partitioning the adjacent cells is rendered uniform. Such being the situation, in the compressible layer in which spherical cells are dispersed uniformly, it is considered reasonable to understand that the buckling of the rubber wall is generated simultaneously when a large smash thickness is applied to the blanket so as to bring about the phenomenon that the compressive stress is scarcely increased in spite of the increase in the smash thickness.

According to the compressible layer containing the spherical voids and the voids having a foreign shape in a ratio defined by formula (1) as in the present invention, it is possible to impart a suitable nonuniformity to the thickness of the rubber matrix partitioning the adjacent voids (cells) so as to make it possible to render nonuniform the deformation behavior of the rubber wall present between the adjacent cells when a smash thickness is applied to the blanket. It follows that it is possible to avoid the phenomenon that the rubber wall in the compressible layer is buckled simultaneously so as to make it possible to narrow the smash thickness region in which the compressive stress does not increase in proportion to the smash thickness. As a result, it is possible to control more accurately the concentration of the printing owing to the smash thickness.

In the compressible printing blanket of the present invention, the problems described below are brought about, if the compressibility of the blanket is increased by (a) softening the rubber matrix of the compressible layer, (b) increasing the porosity of the compressible layer, and (c) increasing the thickness of the compressible layer. In addition, it is possible to promote the problem that the compressive stress is not increased linearly when the smash thickness (pushing amount) is increased.

(a) If the rubber matrix of the compressible layer is softened, the blanket is rendered incapable of withstanding the repeated deformation in the printing step so as to give rise to the sliding of the compressible layer and, thus, to render the printing surface unsatisfactory.

(b) If the porosity of the compressible layer is increased, the thickness of the wall partitioning the adjacent voids is decreased so as to further promote the problem that the compressive stress is not linearly increased when the smash thickness (pushing amount) is increased.

(c) It is difficult to increase the thickness of the compressible layer in view of the specification and construction of the blanket. Also, it is conceivable to divide the compressible layer into two sections and to arrange one of the two divided sections within the fabric layers. However, since the compressible layer is soft, compared with the fabric layer, problems are generated in the original role played by the fabric layer, i.e., in the role of stopping the elongation of the blanket and of imparting a mechanical strength to the blanket. It follows that a trouble such as breakage of the blanket during use is generated.

It is possible to increase the compressibility of the blanket without impairing the proportional relationship between the smash thickness and the compressive stress of the compressible layer and without bringing about the problems pointed in items (a) to (c) described above by allowing the adhesive layer to contain microballoons.

Also, it is possible to suppress the phenomenon that the smash thickness and the compressive stress fail to bear the proportional relationship while ensuring a sufficient compressibility in the blanket, if the adhesive layer is allowed to contain microballoons and if at least one condition of items (1) and (2) given below is satisfied.

(1) The thickness of the compressible layer is decreased.

(2) The amount of the voids within the compressible layer is decreased. For example, the microballoon content of the unvulcanized compressible layer is decreased.

Some Examples of the present invention will now be described with reference to the accompanying drawings.

EXAMPLE 1

<Preparation of Rubber Paste for Adhesive Layer>

Sulfur, a vulcanization accelerator M (2-mercaptobenzothiazole), an aging preventive, a reinforcing agent and a plasticizer were added to 100 parts by weight of a medium high acrylonitrile-butadiene rubber (NBR), and the resultant mixture was dissolved in methyl ethyl ketone so as to prepare a rubber paste A.

<Preparation of Rubber Paste for Compressible Layer>

Rubber paste B was obtained by adding 14 parts by weight of Exbancell 092DE (trade name of microballoons formed of a copolymer between methacrylonitrile and acrylonitrile manufactured by Novel Industries Inc.) and 8 parts by weight of diethylene glycol used as a melting agent to rubber paste A described above. Incidentally, the average particle diameter of the microballoons was 80 μm.

<Lamination and Adhesion Step>

Prepared as the fabric layers were three cotton cloths each having a thickness of about 0.4 mm. Then, one surface of the cotton cloth 2a forming the upper fabric cloth layer was coated with the rubber paste B in a thickness of 0.3 mm so as to obtain an unvulcanized compressible layer. Further, a cotton cloth 4 having a thickness of about 0.4 mm, which was used as a reinforcing layer, was pasted on the coated rubber paste B (unvulcanized compressible layer).

After formation of an unvulcanized adhesive layer 3a by coating the other surface of the cotton cloth 2a with the rubber paste A to a thickness of 0.05 mm, a cotton cloth 2b used as an intermediate fabric layer was pasted to the unvulcanized adhesive layer 3a. Further, after formation of the unvulcanized adhesive layer 3b by coating the surface of the cotton cloth 2b with the rubber paste A to a thickness of 0.05 mm, a cotton cloth 2c used as a lower fabric layer was pasted to the unvulcanized adhesive layer 3b.

Finally, after formation of an unvulcanized adhesive layer 5 by coating the surface of the reinforcing layer 4 with the rubber paste A in a thickness of 0.05 mm, an acrylonitrile-butadiene rubber blended material sheet was laminated as the unvulcanized surface rubber layer 1 on the unvulcanized adhesive layer 5 so as to obtain an unvulcanized compressive rubber blanket (blanket precursor) having a thickness of about 2.1 mm.

<Vulcanizing Step>

The unvulcanized compressible rubber blanket was wound around a metal drum, followed by heating the unvulcanized compressible rubber blanket at 150° C. for 6 hours within a vulcanizing can so as to finish the vulcanization.

Further, the vulcanized compressible rubber blanket was cooled, followed by polishing the surface rubber layer with a sand paper of 240 mesh so as to obtain a compressible blanket constructed as shown in FIG. 1 and having a thickness of 1.9 mm.

EXAMPLE 2

<Preparation of Rubber Paste for Adhesive Layer>

Rubber paste C was obtained by adding 3 parts by weight of microballoons substantially equal to those referred to in Example 1 to the rubber paste A of the composition similar to that referred to in Example 1.

<Preparation of Rubber Paste for Compressible Layer>

Prepared as the rubber paste for the compressible layer was the rubber paste B equal to that referred to in Example 1.

<Lamination and Adhesion Step>

An unvulcanized compressible rubber blanket having a thickness of about 2.1 mm was prepared as in Example 1, except that used was the rubber paste C in the unvulcanized adhesive layer.

<Vulcanizing Step>

After the unvulcanized compressible rubber blanket was wound around a metal drum, the unvulcanized compressible rubber blanket was heated at 150° C. for 6 hours in a vulcanizing can so as to finish the vulcanization.

Further, the vulcanized compressible rubber blanket was cooled, followed by polishing the surface rubber layer with a sand paper of 240 mesh so as to obtain a compressible blanket constructed as shown in FIG. 1 and having a thickness of 1.9 mm.

The microballoons formed of a copolymer between methacrylonitrile and acrylonitrile is scarcely melted and collapsed under the ordinary vulcanizing temperature, i.e., at 120° C. to 160° C., in the case where the melting agent of diethylene glycol is not added or is added in only a small amount. In each of Examples 1 and 2 described above, however, 8 parts by weight of the melting agent was contained in the rubber paste B, with the result that it was possible to form the compressible layer 6 while vulcanizing the surface rubber layer 4, etc. under the ordinary vulcanizing temperature, i.e., at 120° C. to 160° C. It follows that, in each of Examples 1 and 2, it is possible to suppress the deterioration of the cotton cloth caused by the heat. Also, since a microballoon melting agent was not contained in the adhesive layer for Example 2, the microballoons were not melted in the vulcanizing step so as to obtain an adhesive layer containing spherical microballoons.

COMPARATIVE EXAMPLE 1

A compressible blanket having a thickness of 1.9 mm was obtained as in Example 1, except that the mixing amount of diethylene glycol in the rubber paste B was set at 0 parts by weight.

COMPARATIVE EXAMPLE 2

A compressible blanket having a thickness of 1.9 mm was obtained as in Example 2, except that the mixing amount of diethylene glycol in the rubber paste B was set at 0 parts by weight.

The number of spherical voids and the number of foreign-shaped voids (voids other than the spherical voids) in an optional cross section of the cross sections (surfaces to which the laminate structure is exposed) obtained when the compressible blanket is cut in a thickness direction were measured for the compressible blanket obtained in each of Examples 1, 2 and the Comparative Examples 1, 2 so as to calculate the number $S_1$ of spherical voids per unit area (1 mm$^2$) and the number $S_2$ of foreign-shaped voids per unit area (1 mm$^2$), thereby obtaining a ratio between the number $S_1$ of spherical voids per unit area and the number $S_2$ of foreign-shaped voids per unit area. Table 1 shows the results.

Figure 2:
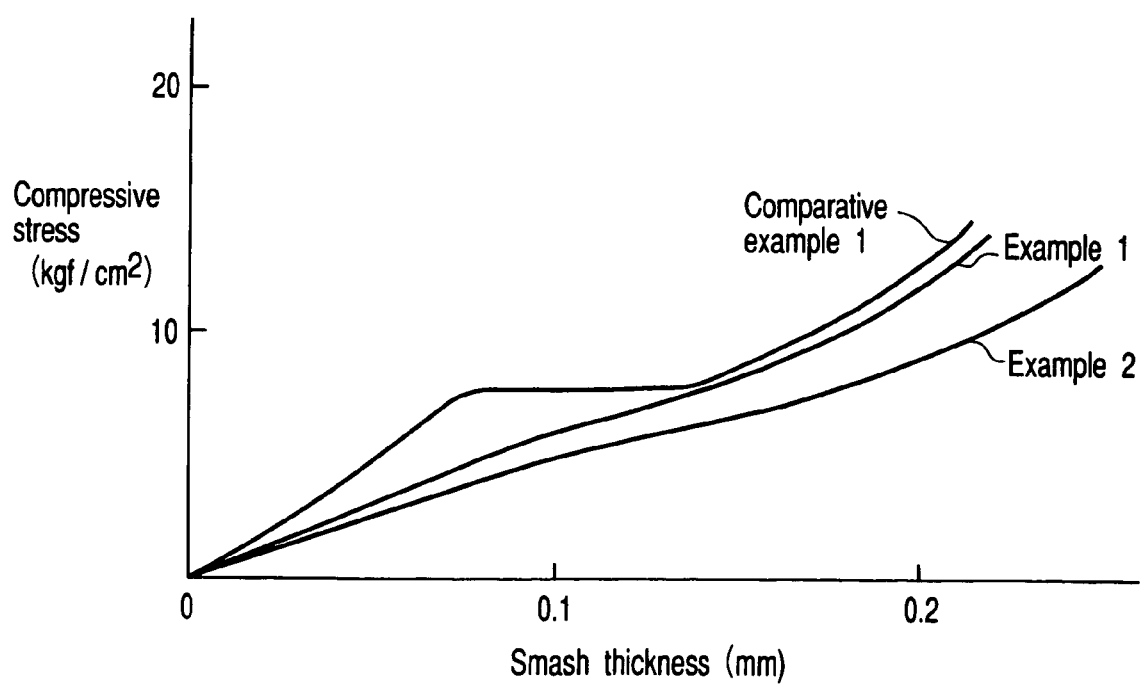
FIG. 2 is a graph showing the relationship between the smash thickness and the compressive stress in the compressible printing blanket for Examples 1 and 2 of the present invention and Comparative Example 1.
Figure 3:
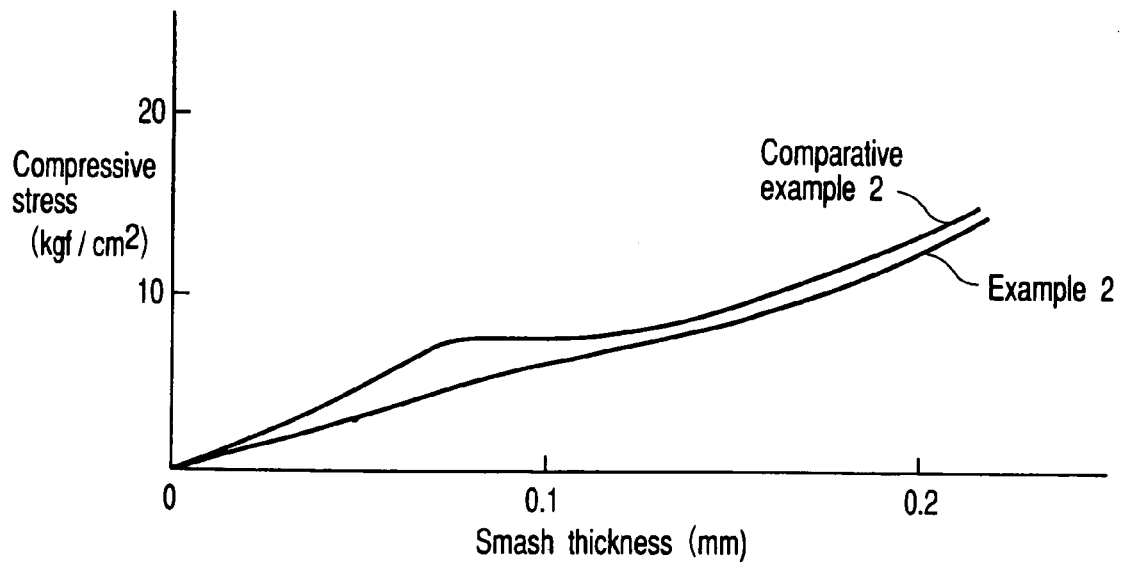
FIG. 3 is a graph showing the relationship between the smash thickness and the compressive stress in the compressible printing blanket for Example 2 of the present invention and Comparative Example 2.

Also, measured was the compressive stress in the case where a column having a diameter of 28 mm was pushed at a compression speed of 2 mm/min into the compressible blanket obtained in each of Examples 1, 2 and the Comparative Examples 1, 2. Each of FIGS. 2 and 3 is a graph showing the compressive stress curve obtained on the basis of the compressive stress thus measured. In the graph of each of FIGS. 2 and 3, the smash thickness (pushing amount) is plotted on the abscissa, with the compressive stress (kg/cm$^2$) plotted on the ordinate.

As apparent from FIG. 2, the compressive stress is increased substantially linearly when the smash thickness (pushing amount) is increased in the compressible blanket for each of Examples 1 and 2 of the present invention. FIG. 2 also shows clearly that a flat region in which the compressive stress is scarcely increased in spite of the increase in the smash thickness is present around the smash thickness of 0.1 mm in the compressible blanket for Comparative Example 1.

On the other hand, FIG. 3 clearly shows that the compressive stress is increased substantially linearly with increase in the smash thickness in the compressible blanket for Example 2 of the present invention. On the other hand, a flat region in which the compressive stress is scarcely increased in spite of the increase in the smash thickness is present in the smash thickness of around 0.1 mm in the compressible blanket for Comparative Example 2.

The compressible rubber blanket for Example 1 of the present invention was used in an off-set rotary press, with the result that it was possible to control smoothly the printing surface relative to the smash thickness. Also, it was possible to increase the compressibility of the compressible rubber blanket for Example 2, compared with the compressible rubber blanket for Example 1. It should be noted that the high compressibility permits diminishing the amount of change in the compressive stress relative to the smash thickness so as to make it possible to perform easily the fine adjustment of the concentration, particularly, the fine adjustment in the region of low concentration. Examples 3 to 5:

A compressible blanket constructed as shown in FIG. 1 and having a thickness of 1.9 mm was obtained as in Example 1, except that the mixing amounts of diethylene glycol in the rubber paste B forming the compressible layer were changed as shown in Table 1.

A ratio of the number $S_1$ of spherical voids per unit area to the number $S_2$ of foreign-shaped voids per unit area was obtained as in Example 1 with respect to the compressible blanket obtained in each of Examples 3 to 5. Table 1 also shows the results.

Figure 4:
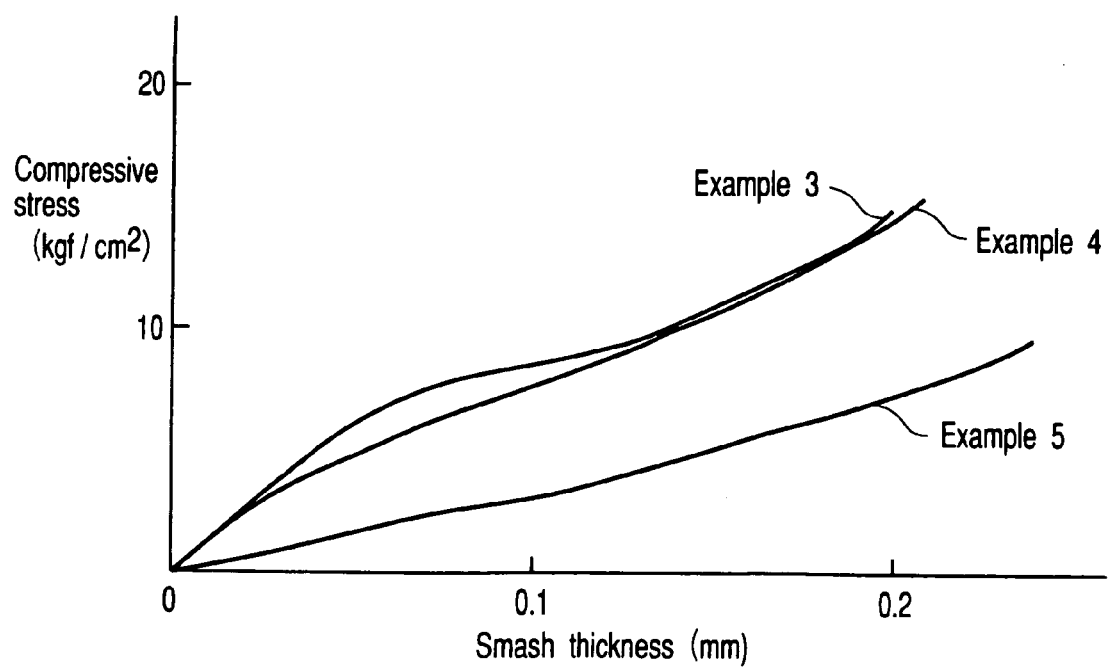
FIG. 4 is a graph showing the relationship between the smash thickness and the compressive stress in the compressible printing blanket for Examples 3 to 5 of the present invention.

The compressive stress was measured as in Example 1 for the compressible blanket obtained in each of Examples 3 to 5 of the present invention, and the compressive stress curves based on the compressive stress thus measured are shown in FIG. 4.

As apparent from FIG. 4, a flat region is not included in the compressive stress curve for the compressible blanket for each of Examples 3 to 5. Particularly, the compressive stress was found to increase substantially linearly with increase in the smash thickness over the entire smash thickness region for the compressible blanket for each of Examples 4 and 5. It should also be noted that the compressibility is increased with increase in the ratio of foreign-shaped voids $S_2$, as apparent from the comparison among the compressive stress curves for Examples 3 to 5.

COMPARATIVE EXAMPLE 3

A compressible blanket constructed as shown in FIG. 1 and having a thickness of 1.9 mm was obtained as in Example 1, except that the mixing amounts of diethylene glycol in the rubber paste B forming the compressible layer were changed as shown in Table 1.

A ratio of the number $S_1$ of spherical voids per unit area to the number $S_2$ of foreign-shaped voids per unit area was obtained as in Example 1 with respect to the compressible blanket obtained in Comparative Examples 3. Table 1 also shows the results.

The compressible blanket for Comparative Example 3 was poor in the restoring capability after receipt of the compressive stress and was not in the state of performing the desired function of the compressible blanket.

TABLE 1

|  | Mixing amount (parts by weight) of diethylene glycol in rubber paste B | Spherical voids: foreign-shaped voids $S_1:S_2$ |
| --- | --- | --- |
| Example 1 | 8 | 60:40 |
| Example 2 | 8 | 60:40 |
| Example 3 | 0.1 | 95:5 |
| Example 4 | 3 | 80:20 |
| Example 5 | 15 | 20:80 |
| Comparative Example 3 | 17 | 15:85 |

As shown in Table 1, the collapse of the microballoon cells greatly proceeded in the compressible blanket for Comparative Example 3, with the result that a major portion of the substantially spherical cells disappeared.

EXAMPLE 6

Prepared as the rubber paste for the adhesive layer was rubber paste A equal in composition to the rubber paste A referred to in Example 1. Also prepared as the rubber paste for the compressible layer was rubber paste B equal in composition to rubber paste B referred to in Example 1.

<First Vulcanizing Step>

Prepared as the fabric layers were three cotton cloths each having a thickness of about 0.4 mm. One surface of the cotton cloth 2a constituting the upper fabric layer was coated with the rubber paste B in a thickness of 0.3 mm, followed by pasting a cotton cloth 4 used as a reinforcing layer and having a thickness of about 0.4 mm to the coated rubber paste B (unvulcanized compressible layer).

After the unvulcanized compressible layer thus obtained was wound around a metal drum, heating was applied to the unvulcanized compressible layer at 150° C. for 6 hours within a vulcanizing can so as to finish the vulcanization.

<Second Vulcanizing Step>

After an unvulcanized adhesive layer 3a was formed by coating the other surface of the cotton cloth 2a with the rubber paste A in a thickness of 0.05 mm, a cotton cloth 2b used as an intermediate fabric layer was pasted to the unvulcanized adhesive layer 3a. Further, after an unvulcanized adhesive layer 3b was formed by coating the surface of the cotton cloth 2b with the rubber paste A in a thickness of 0.05 mm, a cotton cloth 2c used as the lower fabric layer was pasted to the unvulcanized adhesive layer 3b.

Finally, after an unvulcanized adhesive layer 5 was formed by coating the surface of the reinforcing layer 4 with the rubber paste A in a thickness of 0.05 mm, a sheet of an acrylonitrile-butadiene rubber blend was laminated as the unvulcanized surface rubber layer 1 so as to obtain a compressible rubber blanket (blanket precursor), which was partly unvulcanized and had a thickness of about 2.1 mm.

After the partly unvulcanized compressible rubber blanket was wound around a metal drum, heating was applied to the partly unvulcanized compressible rubber blanket at 150° C. for 6 hours within a vulcanizing can so as to finish the vulcanization.

Further, the vulcanized compressible rubber blanket was cooled, followed by polishing the surface rubber layer with a sand paper of 240 mesh so as to obtain a compressible blanket constructed as shown in FIG. 1 and having a thickness of 1.9 mm.

A cross section of the compressible rubber blanket for Example 6, which was cut in a thickness direction, was observed. It has been found that the thickness of the compressible layer was highly uniform, compared with the compressible rubber blanket obtained in Example 1. Also, a ratio of the number $S_1$ of the spherical voids per unit area to the number $S_2$ of the foreign-shaped voids per unit area was determined as in Example 1. The ratio $S_1:S_2$ was found to be 60:40.

EXAMPLE 7 AND 8:

A compressible blanket constructed as shown in FIG. 1 and having a thickness of 1.9 mm was obtained as in Example 1, except that the mixing amounts of diethylene glycol in the rubber paste B forming the compressible layer were changed as shown in Table 2.

A ratio of the number $S_1$ of the spherical voids per unit area to the number $S_2$ of the foreign-shaped voids per unit area was obtained as in Example 1 with respect to the compressible blanket obtained in each of Examples 7 and 8. Table 2 also shows the results.

COMPARATIVE EXAMPLE 4

<Preparation of Rubber Paste for Compressible Layer>

170 parts by weight of salt (NaCl) serving to create open cells and 2 parts by weight of micro-capsules that has an average particle diameter of 80 μm (product of Novel Industry Inc. under a tradename of Exbancell 092DE) were added to the above-mentioned rubber paste A, and thus a rubber paste D was obtained.

<Manufacture of Compressible Layer>

The rubber paste D was applied to have a thickness of 0.3 mm on one side of a cotton cloth 2a that makes an upper substrate fabric layer. Then, a cotton cloth 4 serving as a reinforcement layer and having a thickness of about 0.4 mm was adhered on a coating of a rubber paste D that is an unvulcanized compressible layer.

<Vulcanization of Compressible Layer>

Thus obtained unvulcanized compressible layer was wound around a metal-made drum, and then it was heated at 150° C. for 3 hours in a vulcanizing can, thus completing the vulcanization of the compressible layer.

<Extraction of Salt that Gives Rise to Open Cells in Compressible Layer>

Salt (NaCl) was completely extracted with warm water, and thus a 2-ply compressible layer was obtained. The porous rate of this compressible layer was about 50%. The ratio of the closed cells occupying in all the cells in the compressible layer was about 50% by volume.

<Overlying and Adhesion Step>

Rubber paste A was applied as a coating having a thickness of 0.05 mm on the other surface of the cotton cloth 2a of thus obtained laminate body, and thus an unvulcanized adhesive layer 3a was obtained. After that, a cotton cloth 2b serving as an intermediate substrate cloth layer was adhered on it. Then, rubber paste A was applied as a coating having a thickness of 0.05 mm on the surface of the cotton cloth 2b, and thus an unvulcanized adhesive layer 3b was obtained. Subsequently, a cotton cloth 2c serving as a lower substrate cloth layer was adhered on it.

Lastly, rubber paste A was applied as a coating having a thickness of 0.05 mm on the surface of the reinforcement layer 4, and thus an unvulcanized adhesive layer 5 was obtained. After that, a sheet of nitrile rubber compound was laminated as an unvulcanized surface rubber layer 1 on it. Thus, an unvulcanized compressible rubber blanket having a thickness of 2.1 mm (blanket precursor) was obtained.

<Vulcanizing Step>

The above-described unvulcanized compressible rubber blanket was subjected to a vulcanizing step and polishing step under conditions similar to those explained in EXAMPLE 1 discussed above, and thus a compressible rubber blanket having the above-described structure shown in FIG. 1 and having a thickness of 1.9 mm was obtained.

Further, the compressible blanket for each of Examples 7 and 8 of the present invention and Comparative Examples 1 and 4 was dipped into Further, the compressible blanket for each of Examples 7 and 8 of the present invention and Comparative Example 1 was dipped in a 5% aqueous solution of isopropyl alcohol so as to measure the change in the weight after the dipping for 2 hours and after the dipping for 24 hours. Table 2 also shows the results.

TABLE 2

|  | Mixing amount (parts by weight) of diethylene glycol in rubber paste B | Spherical voids: foreign-shaped voids | Change in weight after dipping for 2 hours (%) | Change in weight after dipping for 24 hours (%) |
| --- | --- | --- | --- | --- |
| Example 7 | 2 | 76:24 | +2.2 | +5.3 |
| Example 8 | 4 | 70:30 | +3.0 | +10.2 |
| Comparative Example 1 | 0 | 100:0 | +0.4 | +1.9 |
| Comparative Example 4 | — | — | +39 | +39 |

As apparent from Table 2, the increase in weight of the compressible blanket, when dipped in an aqueous solution of isopropyl alcohol, is larger in each of Examples 7 and 8 of the present invention than that in Comparative Example 1. The large increase in weight in the present invention was caused by the phenomenon that the 5% aqueous solution of isopropyl alcohol was taken into the compressible layer in the compressible blanket for the present invention. The dipping experiment supports that open cells (voids) are formed by the collapse of the microcapsules so as to allow the compressible layer to contain both spherical voids and foreign-shaped voids. Incidentally, an open cell structure is formed partially in the compressible layer of the compressible blanket for each of Examples 7 and 8, with the result that it is possible to avoid the problem that the washing solution remains within the compressible layer when the compressible blanket is subjected to an automatic washing.

The partial open cell structure is not a type that is obtained by the salt leaching method, but it is made as several microcapsules are coupled together as one unit. As a pore formed by connecting several microcapsules together is regarded as a unit pore, each unit pore is an independent pore, that is, a closed pore. Therefore, the compressible layer having such a partial open cell structure is different from such a compressible layer having an open cell structure in which a great number of pores are connected together, as disclosed in, for example, Jpn. Pat. Appln. KOKAI Publication No. 10-175381.

In the blanket of Comparative Example 4 comprising a compressible layer having open cells, the amount of cleaning solution remaining was significantly greater as compared to those of the cases of Examples 7 and 8 and Comparative Example 1.

A cross section, to which the laminate structure is exposed, of the compressible blanket for each of Examples 7 and 8 was observed with a scanning electron microscope. It has been found that both the spherical voids and the foreign-shaped voids are present in the compressible layer, that most of the spherical voids are formed of the voids of the spherical microballoons, that the foreign-shaped voids includes the voids of the microballoons deformed by the melting and the voids in which the partitions provided by the microballoons are not found and pieces of the microballoons collapsed by the melting were found to be present. Further, substantially all the microballoons added to the adhesive layer for Example 2 were found to retain a spherical shape equal to the shape before addition to the adhesive layer.

Figure 5:
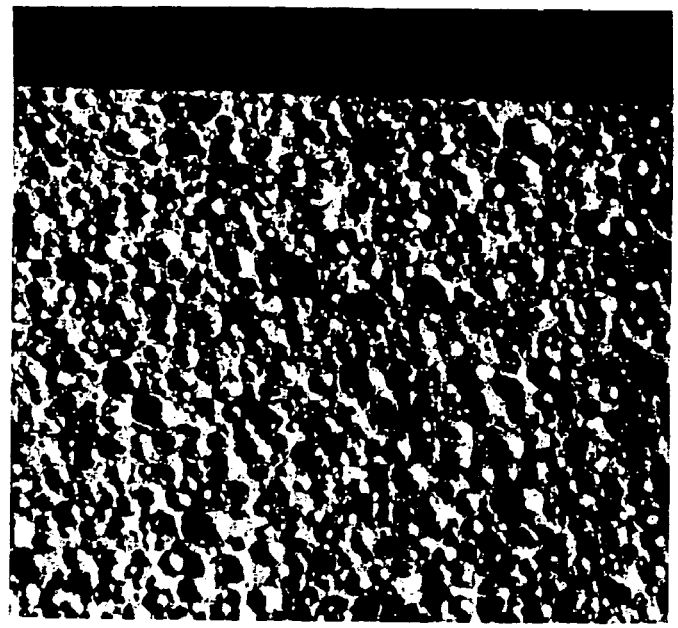
FIG. 5 is a scanning electron micrograph having a magnification of up to 45 in a cross section of a compressible printing blanket for Example 7 of the present invention.
Figure 6:
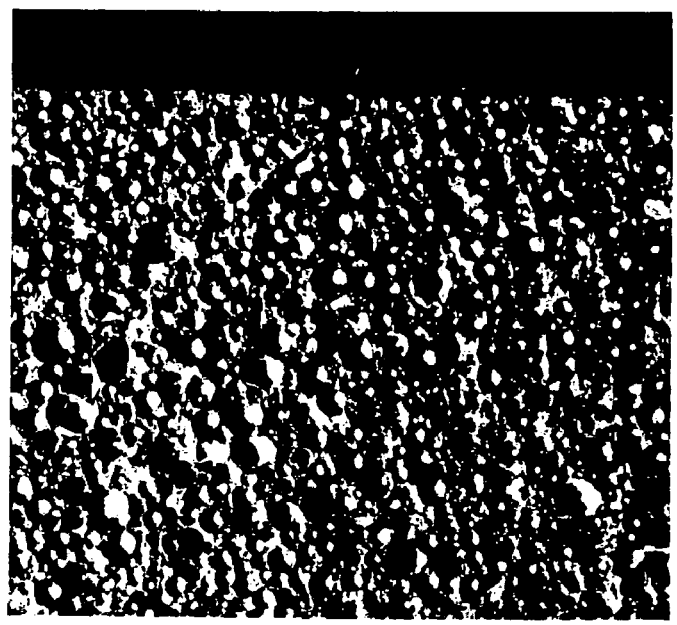
FIG. 6 is a scanning electron micrograph having a magnification of up to 45 in a cross section of a compressible printing blanket for Comparative Example 1.
Figure 7:
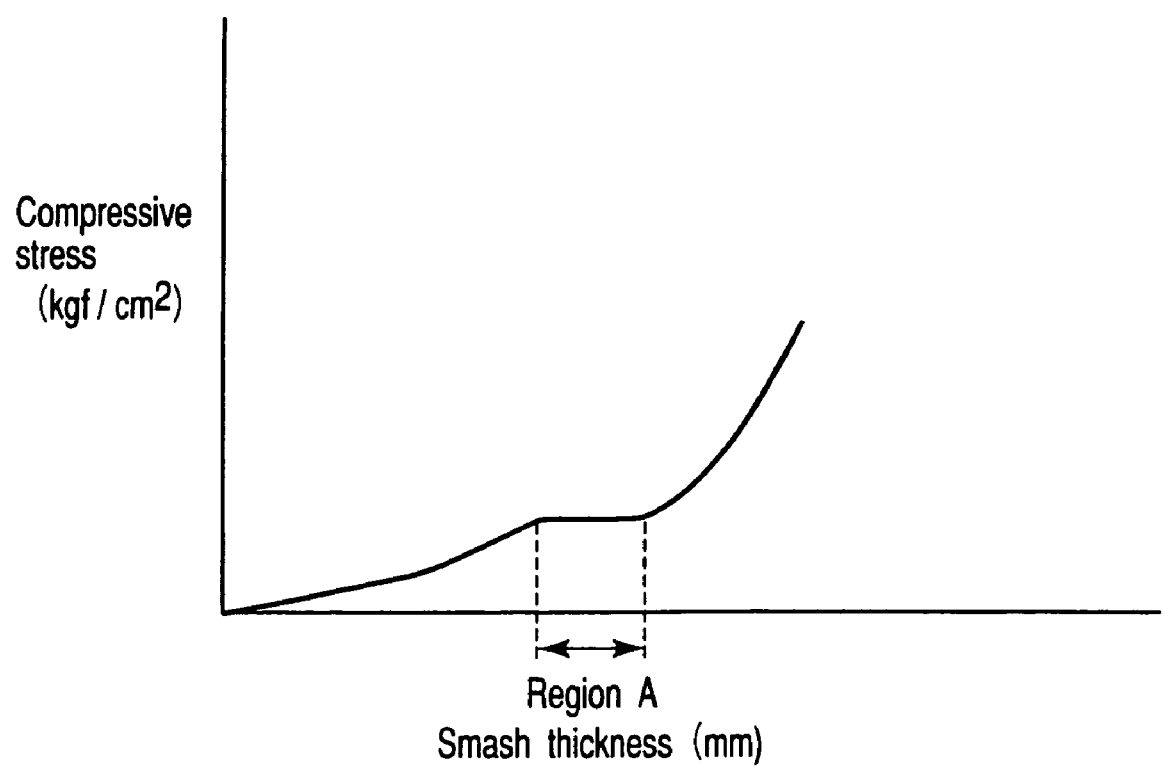
FIG. 7 is a graph showing the change in the compressive stress relative to the change in the smash thickness in respect of a conventional compressible printing blanket.

FIG. 5 is a scanning electron micrograph (magnification of 45) showing the compressible blanket for Example 7, and FIG. 6 is a scanning electron micrograph (magnification of 45) showing the compressible blanket for Comparative Example 1.

As apparent from FIGS. 5 and 6, both the spherical voids and the foreign-shaped voids are present in the compressible layer of the compressible blanket for Example 7, and substantially all the voids are spherical in the compressible layer of the compressible blanket for Comparative Example 1.

As described above in detail, the present invention provides a compressible printing blanket having a diminished smash thickness region in which the compressive stress is not increased linearly with increase in the smash thickness in the compressive stress curve and a method of manufacturing the particular compressible printing blanket.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A compressible printing blanket in which voids are formed in the compressible layer by using microballoons, comprising:
    at least two fabric layers;
    an adhesive layer interposed between adjacent fabric layers;
    a surface rubber layer; and
    a compressible layer arranged between said at least two fabric layers and said surface rubber layer and containing spherical voids and closed voids having a shape other than a sphere in a ratio defined in formula given below:

$$S_1:S_2=20:80 \text{ to } 95:5 \quad (1)$$

where, $S_1$ denotes the number of spherical voids per unit area in a cross section of said compressible layer, and $S_2$ denotes the number of voids having a shape other than a sphere per unit area in a cross section of said compressible layer.

2. The compressible printing blanket according to claim 1, wherein the thickness of said compressible layer falls within a range of between 0.2 mm and 0.6 mm.

3. The compressible printing blanket according to claim 1, wherein the thickness of said adhesive layer falls within a range of between 0.03 mm and 0.1 mm.

4. The printing compressible blanket according to claim 1, wherein the compressible layer is not of an open cell structure.

5. The printing compressible blanket according to claim 1, wherein the compressible layer has a partially open cell structure.

6. The printing compressible blanket according to claim 1, wherein the closed voids having a shape other than a sphere are formed by melting of the microballoons.

7. The compressible blanket according to claim 1, wherein the compressible layer has a ratio defined in the formula (1a) given below:

$$S_1:S_2=20:80 \text{ to } 80:20 \quad (1a)$$

where, $S_1$ denotes the number of spherical voids per unit area in the cross section of said compressible layer, and $S_2$ denotes the number of closed voids having a shape other than a sphere per unit area in the cross section of said compressible layer.

8. The printing compressible blanket according to claim 1, wherein the microballoons are formed of at least one thermoplastic resin selected from the group consisting a copolymer comprising methacrylonitrile and acrylonitrile, homopolymers and copolymers of vinylidene halide, fluorine-containing plastic materials, polyaryl ether ketones, nitrile resins, polyamide imides, polyarylates, polybenzoimidazoles, polycarbonates, thermoplastic polyesters, polyether imides, polyamides, polymethyl pentene, modified polyphenylene oxide, polyphenylene sulfide, polypropylene, and chlorinated polyvinyl chloride.

9. The printing compressible blanket according to claim 1, wherein the microballoons contain a copolymer comprising methacrylonitrile and acrylonitrile.

10. A compressible printing blanket in which voids are formed in the compressible layer by using microballoons, comprising: at least two fabric layers;
    an adhesive layer interposed between adjacent fabric layers; a surface rubber layer; and
    compressible layer arranged between said at least two fabric layers and the surface rubber layer and the voids essentially consisting of closed spherical voids and closed voids having a shape other than a sphere in a ratio defined in formula given below:

$$S_1:S_2=20:80 \text{ to } 95:5 \quad (1)$$

where $S_1$ denotes the number of closed spherical voids per unit area in a cross section of the compressible layer, and $S_2$ denotes the number of closed voids having a shape other than a sphere per unit area in a cross section of the compressible layer.

11. The compressible printing blanket according to claim 1, wherein the adhesive layer contains voids.

12. The compressible printing blanket according to claim 1, wherein the adhesive layer contains microballoons.

13. The compressible printing blanket according to claim 1, wherein the closed voids having a shape other than a sphere are made of molten materials of the microballoons.

14. The compressible printing blanket according to claim 1, wherein the closed voids having a shape other than a sphere are microballoons melted by glycols.

* * * * *